UNITED STATES PATENT OFFICE 2,625,517

COAGULATION OF OIL EMULSIONS WITH CELLULOSE SULFATE

John R. Caldwell, Kingsport, Tenn., assignor to Eastman Kodak Company, Rochester, N. Y., a corporation of New Jersey No Drawing. Application October 19, 1951, Serial No. 252,195

6 Claims. (Cl. 252—332)

This invention relates to the coagulation and separation of oil-in-water emulsions by means of aqueous solutions of cellulose sulfate salts.

It is well known in the oil industry that troublesome emulsions of oil in water are frequently obtained during the pumping and handling of crude oil, both at the well and in storage equipment. The use of various materials such as soaps, gum arabic, alginic acid salts and the like has been proposed as coagulating agents to break such emulsions. Many of these agents have proved to be ineffective, particularly in the presence of calcium, iron or other metallic ions which might be present in solution in the water.

One object of my invention is to provide an improved method for coagulating and separating oil-in-water emulsions. Another object of my invention is to provide a method for breaking oil emulsions that are produced in oil wells and in oil processing equipment. A further object of my invention is to produce a method for breaking the oil-in-water emulsions that are produced in producer gas scrubbing systems and in coke oven gas scrubbing systems. Other objects of my invention will appear herein.

These objects of my invention are accomplished by employing soluble salts of cellulose sulfate as coagulating agents for oil-in-water emulsions. The soluble salts of cellulose sulfate, such as of sodium, form soluble salts with polyvalent ions such as calcium and iron, and hence no precipitation occurs when cellulose sulfate is used as the coagulation agent. Also, because the salts of cellulose sulfate are salts of strong acids, sodium cellulose sulfate is not effected by changes in pH, whereas other coagulating agents, such as those containing a carboxyl group, are deactivated or precipitated at a pH of 6 or lower.

Oil-in-water emulsions may be coagulated in accordance with my invention by mixing therewith cellulose sulfate salt, the amount employed depending upon the nature of the emulsion being treated. The amount of cellulose sulfate salt may be from 0.01% to 5.0%, but ordinarily a proportion within the range of 0.1% to 2% is used, these percentages being based on the weight of the oil phase of the emulsion. The treatment may be either by adding the cellulose sulfate salt to the emulsion or by first dissolving it in water and adding the aqueous solution to the emulsion. The emulsion containing the cellulose sulfate salt may be heated, which treatment increases the rate of separation of the oil from the water. If desired, the mass may be subjected to a centrifuging treatment. Ordinarily, however, separation may be accomplished by a gravity separation.

The cellulose sulfate employed in accordance with my invention may be that made by the methods described in U. S. Patent Nos. 2,559,914 of Georges Frank or 2,539,451 of Malm and Crane. I have found that the alkali metal salts of cellulose sulfate are particularly suitable for use in breaking emulsions in accordance with my invention. However, any of the other water soluble salts may be employed, for instance, the ammonium or amine salts. Some of the bases which are useful for preparing salts by neutralizing cellulose sulfate, which salts are useful for the purpose described, are as follows: di-n-butyl amine, tri-isoamyl amine, diethyl amine, n-butyl amine, N,N-diethyl cyclo-hexyl amine and the like.

The following examples illustrate the breaking of emulsions in accordance with my invention:

Example 1

An emulsion containing about 10% crude oil which was obtained during the pumping of an oil well was stirred at room temperature, and 0.5 part of sodium cellulose sulfate per 100 parts of the emulsion was added. After the sodium cellulose sulfate had dissolved, the emulsion was allowed to settle. The mass separated into an oil layer and a water layer in 3-4 hours.

Example 2

An aqueous emulsion containing 5-6% of crude oil was obtained from an oil well storage tank system. Four-tenths of one percent of sodium cellulose sulfate, based on the weight of oil phase, was added. Steam was then passed into the emulsion until it reached a temperature of 60-70° C. After standing for several hours, the emulsion broke, and the oil separated as a top layer. The oil was then separated from the aqueous portion of the mass by decantation.

Example 3

An emulsion containing 6% of hydrocarbons was obtained in the scrubbing tower of a coke oven gas system. 1% sodium cellulose sulfate, based on the weight of the oil phase, was added. The mass was then agitated at 40-50° C. for 30 minutes, whereupon the emulsion broke and two layers were formed. After standing for one hour the layers were separated by decantation.

Example 4

An oil well emulsion was stirred and 1% of ammonium cellulose sulfate was added, based on the weight of the oil phase. After the cellulose sulfate salt had dissolved, the emulsion was allowed to stand, and separated into an oil layer and a water layer in about four hours, which layers could be easily separated.

*Example 5*

An oil-in-water emulsion obtained from a producer gas scrubbing system was agitated at 40-50° C., and the butyl amine salt of cellulose sulfate was added thereto in the proportion of 2% of salt based on the weight of the oil phase. After agitating the mass for a period of about 50 minutes, the mass was allowed to stand. It was found that the emulsion had been broken and an oil and a water layer formed. The oil was separated from the water layer.

My invention is applicable to any type of oil-in-water emulsion wherein separation of the oil and water into two layers is desirable, particularly in those cases where the oil is of the hydrocarbon type. My invention is particularly useful in those cases where the materials are of a crude nature in view of the fact that the cellulose sulfate salt is not effected by various impurities and contaminating materials which may be present in such a system. Also, pH variations produce no adverse effect upon the effectiveness of cellulose sulfate salts for breaking emulsions as described herein.

I claim:

1. A method of coagulating oil-in-water emulsions which comprises adding thereto a water soluble salt of cellulose sulfate in a proportion of 0.01-5%, based on the weight of the oil phase under conditions whereby the aqueous portion of the emulsion contains the cellulose sulfate salt in solution therein.

2. A method of breaking emulsions of petroleum in water which comprises adding to the emulsion a small proportion of a water soluble salt of cellulose sulfate whereby there is obtained a solution of the cellulose sulfate salt in the aqueous phase of emulsion in a proportion of .01-5%, based on the weight of the oil phase of the emulsion.

3. A method for coagulating oil-in-water emulsions which comprises adding thereto .01-5% of sodium cellulose sulfate, based on the weight of the oil phase of the emulsion.

4. A method for coagulating oil-in-water emulsions which comprises adding thereto .01-5% of ammonium cellulose sulfate, based on the weight of the oil phase of the emulsion.

5. A method for coagulating oil-in-water emulsions which comprises adding thereto .01-5% of a water-soluble amine salt of cellulose sulfate, based on the weight of the oil phase of the emulsion.

6. A method for coagulating oil-in-water emulsions which comprises adding to the emulsion .01-5% of sodium cellulose sulfate based on the weight of the oil phase of the emulsion, and agitating the mass while at an elevated temperature below that at which any of the components of the emulsion boil off.

JOHN R. CALDWELL.

REFERENCES CITED

The following references are of record in the file of this patent:

UNITED STATES PATENTS

| Number | Name | Date |
|---|---|---|
| 2,159,313 | Blair et al. | May 23, 1939 |
| 2,539,478 | Roberson | Jan. 30, 1951 |